United States Patent [19]

Büscher

[11] Patent Number: 4,599,775
[45] Date of Patent: Jul. 15, 1986

[54] METHOD FOR MANUFACTURING SYNCHRONIZER CLUTCH TEETH

[75] Inventor: Josef Büscher, Pulheim, Fed. Rep. of Germany

[73] Assignee: Ford Motor Company, Dearborn, Mich.

[21] Appl. No.: 690,277

[22] Filed: Jan. 10, 1985

[30] Foreign Application Priority Data

Mar. 5, 1984 [DE] Fed. Rep. of Germany ....... 3408065

[51] Int. Cl.$^4$ ............................................. B21D 53/28
[52] U.S. Cl. ..................... 29/159.2; 72/341; 72/356
[58] Field of Search .............................. 29/159 R, 159.2; 72/341, 356; 74/192

[56] References Cited

U.S. PATENT DOCUMENTS 2,533,648  12/1950  Warburg et al. .................. 29/159.2
3,720,989  3/1973   Ramond ............................ 29/159.2

FOREIGN PATENT DOCUMENTS 622160   5/1927  France ............................. 29/159.2
1190150  4/1970  United Kingdom ............... 29/159.2

Primary Examiner—Howard N. Goldberg
Assistant Examiner—P. W. Echols
Attorney, Agent, or Firm—Frank G. McKenzie; Donald J. Harrington

[57] ABSTRACT

A method for making clutching teeth having crown bevels and rear cut sections includes fine stamping crown bevels on the front face of the raw part, trimming the outer surface of the part, bending the portion of the part in which the teeth are being formed through an angle equal to the inclination of the rear cut section with respect to the axis of the part, punch cutting the clutching teeth and bending the part back into the original plane.

2 Claims, 6 Drawing Figures

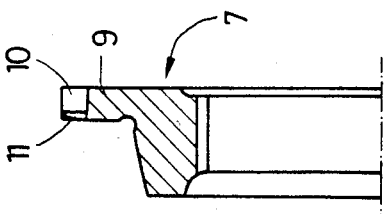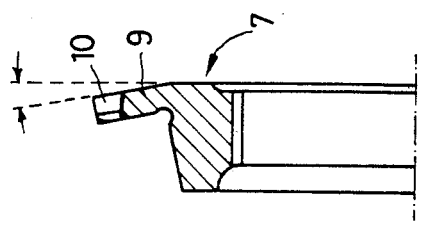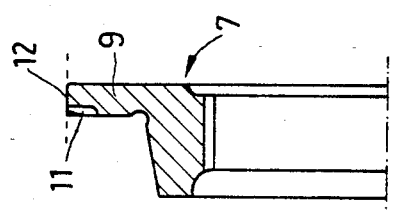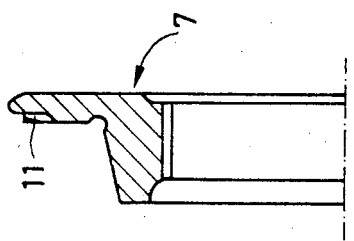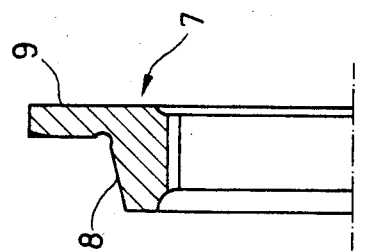

METHOD FOR MANUFACTURING SYNCHRONIZER CLUTCH TEETH

BACKGROUND OF THE INVENTION

1. Field of the Invention

This invention relates to a method for manufacturing clutch teeth and, more particularly, pertains to a method for making sychronizer clutch teeth having crown bevels and rear cut sections.

2. Description of the Prior Art

In multiple speed ratio manual transmissions used for motor vehicles, synchronizing clutches are used to make the gear changes. The synchronizing clutches include a synchronizer clutch hub driveably connected to a driven shaft on which the gearing is journalled and a sliding sleeve, which is axially displaceable but secure against rotation, located on the outer perimeter of the hub. Synchronizing bolts carried on synchronizing rings interact with a blocker ring journalled on a conical surface of the gear wheel. The gear wheel carries clutching teeth engageable with the internal teeth of the sleeve as it moves toward the gear wheel.

In order to facilitate engagement of the clutching teeth of the gear wheel with the sleeve teeth, the clutching teeth are formed with crown bevels. In order to prevent the sliding sleeve from springing out of engagement with the clutching teeth, the gear track of the clutching teeth has rear cut sections. The clutching teeth on the journalled gear wheel was made by the rolling butt process, an expensive operation in which the radial groove remains between the gear wheel and the clutching teeth in order to allow the butt knife to run out.

In order to fully use the length of the gear wheel to transmit the torque and to simplify the manufacture of the clutching teeth, it has been proposed to form the clutching teeth on an initially separate coupling component part, which is later connected secure against rotation to the gear wheel.

This invention relates more particularly to the manufacture of the clutching teeth on a component of this kind, on which a cone ring and a coupling rim are formed integrally.

Recognizing that fine punching of gearing is possible, as it is for example in the manufacture of chain sprocket wheels, an object of this invention is to provide a method for manufacturing clutching teeth having crown bevels and rear cut sections that can be manufactured completely in a series of fine stamping and fine punching steps. Furthermore, the method permits the manufacture of an arrangement of relatively thick and thin coupling teeth distributed round the perimeter of the coupling component.

According to the invention, these objects are achieved first by fine stamping the crown bevels on a coupling rim. Next, the outer surface of the coupling rim is removed; then the coupling rim is bent conically through a certain angle against the cutting direction. The clutching teeth are produced by punch-cutting, after realigning the coupling rim into the radial plane from which it was previously bent. The desired rear cut section on the clutch gearing is made without any extra finishing work.

BRIEF DESCRIPTION OF THE DRAWINGS

The invention will now be explained in more detail with reference to an embodiment illustrated in the accompanying drawings.

FIGS. 2A through 2B are a cross section through the coupling component ilustrating a sequence of processing steps, starting from the raw part through the corresponding intermediate stages to the finished part.

DESCRIPTION OF THE PREFERRED EMBODIMENT

Figure 1:
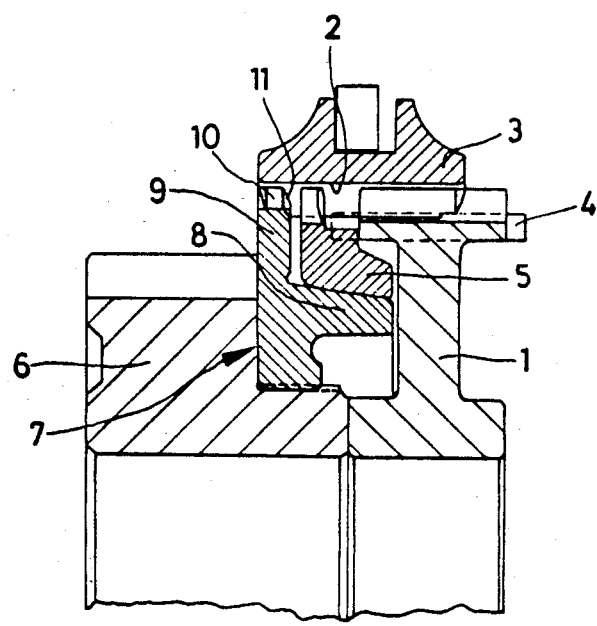
FIG. 1 illustrates a conventional synchronizing clutch having a coupling component part, separate from the gear wheel, on which a cone ring and a coupling rim are formed.

A conventional synchronizing system is indicated in FIG. 1. It consists of a synchronizer hub 1, splined to the shaft on which the gear wheel 6 is journalled, and a sliding sleeve 3, which is held secure against rotation on the outer perimeter of the hub by corresponding inner gearing 2. The sleeve is axially displaceable and can act on a blocker ring 5 via a synchronizing bolt 4. A gear wheel 6 is connected by splines to a separate coupling component 7 to prevent rotation relative to component 7, which has a cone ring 8, a coupling rim 9 and clutching teeth 10. The clutch teeth 10 should have a crown bevel 11, which facilitates engagement, and a rear cut section on the gearing 10, which prevents the sliding sleeve from disengaging from the clutching teeth while torque is being transmitted between them.

The processing steps for manufacturing the clutch teeth according to the invention are shown in FIG. 2. In the section marked 0, the coupling component 7 is shown with the cone ring 8 and the coupling rim 9. The coupling component 7 can be a sheet metal pressed part made by deep drawing of the cone ring 8, which is a forged part with subsequent processing.

In the first step, the crown bevel 11 for the clutch gearing is fine-stamped at the front of the tooth in a first tool wherein the displaced material of the part flows radially outward.

In the second step, the outer surface 12 of the coupling rim 9 is removed and finished.

In the third step, the coupling rim 9 is bent conically through an angle corresponding to the desired rear cut section away from the cutting direction. The clutch teeth are formed by punch cutting through the thickness of the rim 9 at the rear portion of the teeth.

The fourth step, the shape of the finished part results by bending the coupling rim 9 back into alignment the radial plane from which it was previously bent.

The coupling part formed by the method according to this invention can be fine-stamped and fine-punched in an inexpensive automatic fine-cutting machine with a four-stage tool starting from a simple blank and ending in the desired finished part.

An advantage compared to the rolling butt processing required now in the prior art is that the need for clutching teeth whose thicknesses vary round the perimeter of the part can be realized simply by suitably modified tools.

Having described a preferred embodiment of my invention, what I claim and desire to secure by U.S. Letters Patent is:

1. A method for making clutching teeth having crown bevels and rear cut sections on a part of a synchronizer clutch comprising:

fine stamping the crown bevels on a face of the part;
removing material from the circumference of the part;
bending the part through an angle corresponding to the angle at which the rear cut sections are to be inclined with respect to an axis of the part,
punch cutting the clutching teeth; and
bending the part back into substantial alignment with the plane from which it was previously bent.

2. A method for making clutching teeth having crown bevels and rear cut sections on a part of a synchronizer clutch comprising:
fine stamping crown bevels on the front face of the part;
finishing the circumference of the part;
bending the part forward through an angle corresponding to the angle at which the rear cut sections are to be inclined with respect to an axis of the part;
punch cutting the clutching teeth; and
bending the part back substantially to the position from which it was previously bent.

* * * * *